United States Patent [19]

Thomas

[11] Patent Number: 4,704,693

[45] Date of Patent: Nov. 3, 1987

[54] ACOUSTIC TOOL TOUCH DETECTOR WITH MINIMIZED DETECTION DELAY

[75] Inventor: Charles E. Thomas, Scotia, N.Y.

[73] Assignee: General Electric Company, Schenectady, N.Y.

[21] Appl. No.: 749,845

[22] Filed: Jun. 28, 1985

[51] Int. Cl.⁴ .................. G08B 21/00; G06F 15/36; G01M 7/00

[52] U.S. Cl. ........................ 364/508; 73/609; 73/660; 340/680; 340/683; 364/551

[58] Field of Search ............... 364/550, 551, 508, 517; 340/680, 683; 73/609, 613, 660

[56] References Cited

U.S. PATENT DOCUMENTS

| | | | |
|---|---|---|---|
| 3,913,084 | 10/1975 | Bollinger et al. | 340/683 |
| 4,366,544 | 12/1982 | Shima et al. | 340/683 |
| 4,428,055 | 1/1984 | Kelley et al. | 364/474 |
| 4,437,163 | 3/1984 | Kurihara et al. | 364/508 |
| 4,453,223 | 6/1984 | Ravel | 364/517 |
| 4,514,797 | 4/1985 | Begin | 364/148 |
| 4,547,771 | 10/1985 | Rockwood et al. | 340/683 |
| 4,614,117 | 9/1986 | Taniguti | 340/683 X |
| 4,631,683 | 12/1985 | Thomas et al. | 364/474 |
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |

Primary Examiner—Felix D. Gruber
Attorney, Agent, or Firm—Donald R. Campbell; James C. Davis, Jr.; Paul R. Webb, II

[57] ABSTRACT

A Machine Tool Monitor detects the sudden increase in vibration signal level when a slowly advancing cutting tool first touches the workpiece. The delay to a tool touch decision is reduced while still avoiding false alarms on high amplitude single-peaked and multi-peaked noise spikes. Samples of the preprocessed analog vibration signal that are above a low threshold level are analyzed by digital tool touch detection logic. The signal slope polarity is determined by comparison of a new sample to the tracking mean, or by sample-to-sample amplitude comparisons, and presented to an up/down counter. A tool touch alarm is generated when the positive slope counts exceed the negative slope counts by a preset number slightly greater than occur in a time period from the start of a noise spike until its peak amplitude is passed.

10 Claims, 9 Drawing Figures

ANALOG CHANNEL OUTPUT SIGNAL

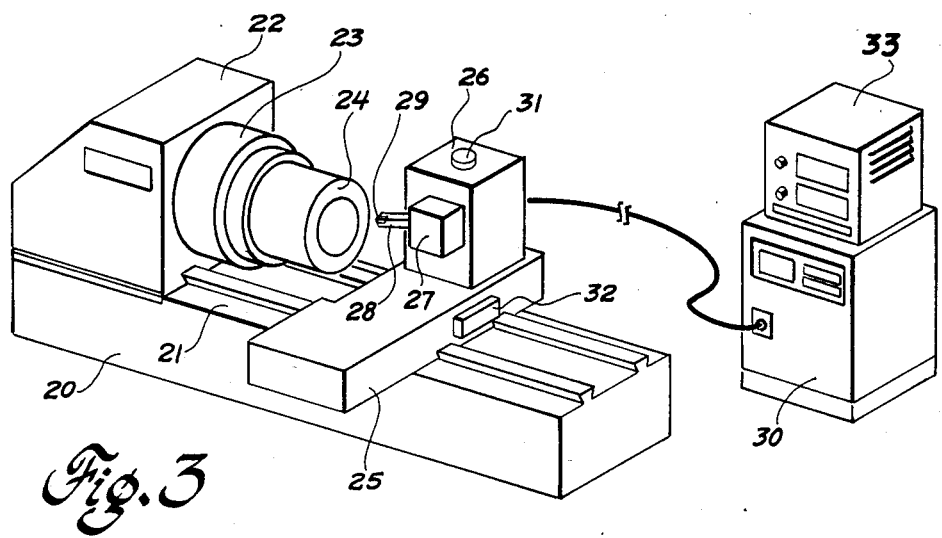
*Fig.3*
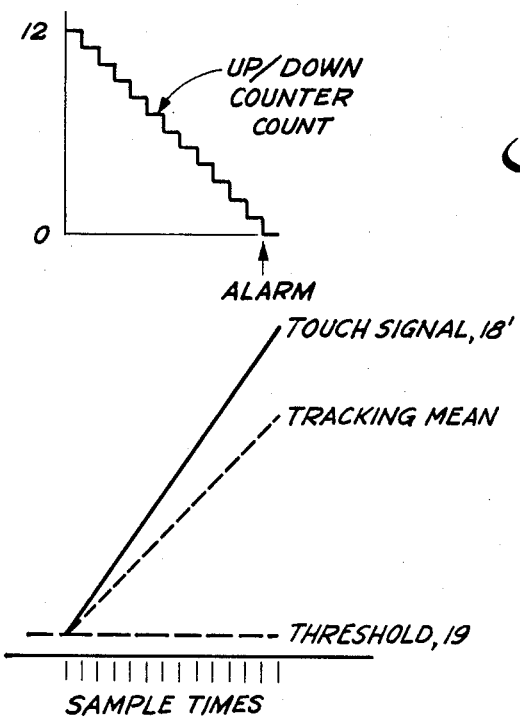
*Fig.4a*
*Fig.4b*

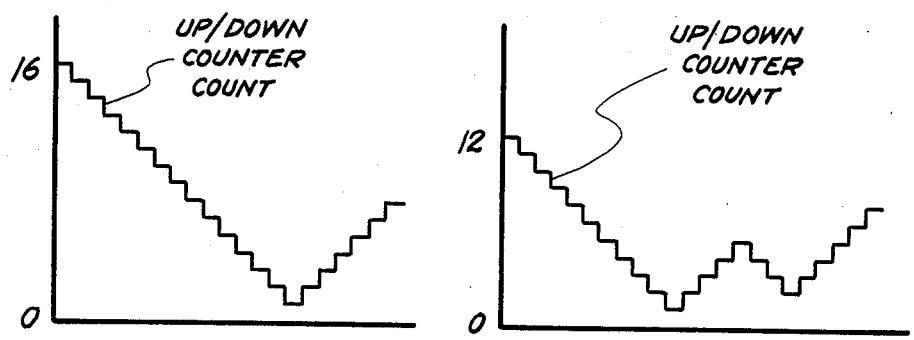
*Fig. 5a*  *Fig. 6a*
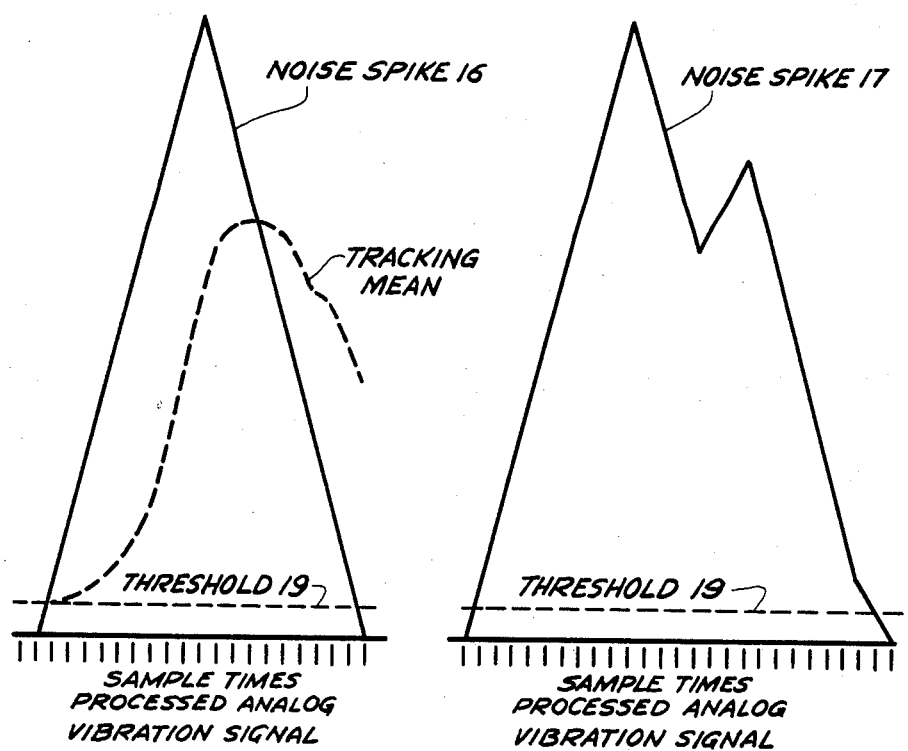
*Fig. 5b*  *Fig. 6b*

ACOUSTIC TOOL TOUCH DETECTOR WITH MINIMIZED DETECTION DELAY

The Government has rights to this invention pursuant to Contract No. F33657-83-C-2065 awarded to the Air Force.

BACKGROUND OF THE INVENTION

This invention relates to an improved system and method to promptly detect the vibration caused by contact between a cutting tool and workpiece without false alarming on machine tool noises.

A Machine Tool Monitor detects the sudden increase in vibration level when a slowly advancing tool insert first touches the workpiece. Prompt detection of the tool touch event before the tool advances far enough to mar the workpiece requires setting a low vibration threshold for the detection decision. On some machine tools spiky noise of short duration but high amplitude is encountered. If measures are not taken to prevent false alarms on these noise spikes, erroneous data on the location of the workpiece surface will be generated. The touch features of the Machine Tool Monitor can be used to set tool offsets and for on-line measurement of part dimensions.

Noise spikes encountered on production lathes in testing acoustic touch detection equipment have amplitudes as high as several hundred times the tool touch detection threshold that must be set to assure prompt detection of the tool touch event. However, noise spike duration has consistently fallen in a narrow band from 8 to 14 milliseconds, measured at the touch threshold level, indicating that the major factor determining spike duration is the anti-aliasing filter in the touch detection system analog preprocessing circuitry. The cutoff frequency of this filter is low enough to prevent aliasing from the subsequent sampling operation in the digital subsystem. The sampling period is long enough to accomplish digital analysis of the signal between analog signal samples. Therefore, it is not desirable to increase the filter cutoff frequency to shorten the noise spike duration.

This invention is an improvement over U.S. Pat. No. 4,428,055 to J. R. Zurbrick and J. R. Kelley and over copending application Ser. No. 645,203, filed August 29, 1984, now U.S. Pat. No. 4,631,683, Thomas et al., "Acoustic Detection of Contact Between Cutting Tool and Workpiece". The latter eliminates the false alarm problem by delaying the tool touch alarm for a period longer than the known maximum duration of such noise pulses; this is 15 milliseconds for the example above, which permits the tool to advance after the initial touch about 0.2 mil into the workpiece at a nominal touch test advance rate of one inch per minute. This delay, added to other unavoidable system delays, is only marginally acceptable since it requires increasing measurement time by use of slower tool advance rates if the system is to be used for other than initial and intermediate cuts, where some part marring is acceptable. It has been suggested, in an analog circuit approach, to test for slope polarity after crossing the detection amplitude threshold and waiting long enough to pass the noise pulse peak, and dismiss the signal if the slope is negative. There is a reduction in delay time to alarm, but occasional false alarms occur due to multi-peaked noise pulses.

SUMMARY OF THE INVENTION

An object of the invention is to minimize touch detection delay and improve upon the performance of previous machine tool monitors while eliminating false alarms on single- and multi-peaked high amplitude noise pulses.

Another object is to provide a solution to the problem of false alarming on spiky machine tool noise that is compatible with the digital techniques of a Machine Tool Monitor tool break detector so that no additional hardware is needed to add tool touch detection capability to the machine tool monitor system.

The improved acoustic tool touch detector according to a preferred embodiment has the following components. A vibration sensor such as a broadband accelerometer is positioned on the machine tool to sense vibrations at the tool/workpiece interface and other machine tool noises, and generates a corresponding electrical signal. An analog preprocessor is comprised of means to amplify and bandpass filter the signal to attenuate lower frequency machinery noise, and energy detector means comprised of a rectifier and the anti-aliasing low pass filter. The unipolar output signal is presented to means for sampling the waveform and converting analog signal samples to digital format. The tool touch detection logic in the digital subsystem determines if the signal crosses a low threshold and then the polarity of the signal amplitude slope. It has, first, means to detect any signal sample above a low threshold level which exceeds the continuous traverse noise level resulting from operation of the machine tool with no tool/workpiece contact. Second, means for comparing every current above-threshold sample with the previous sample, or with a tracking mean which is the average of the current and N preceding samples, to indicate the signal slope polarity. Third, means such as an up/down counter to generate a tool touch alarm when positive slope indications or counts exceed negative slope counts by a given number selected to reject single-peaked and multi-peaked noise spikes as false alarms. The preset number to trigger an alarm may be slightly greater than the maximum number of counts or samples in a time period from crossing the threshold level to the peak of a high amplitude noise spike.

Another feature of the method to reduce the delay to recognizing a tool touch event vibration signature is that the alarm signal is communicated to the machine tool control to stop the advance of the tool.

BRIEF DESCRIPTION OF THE DRAWINGS

FIG. 3 is a simplified perspective view of a horizontal turret lathe on which a Machine Tool Monitor is installed.

FIGS. 4a and 4b relate to touch signal detection and show the counts in the up/down counter and the touch signal and tracking mean.

FIGS. 5a and 5b relate to rejection of a single-peaked noise spike and show the counts in the up/down counter and the noise spike signal and tracking mean.

FIGS. 6a and 6b relate to rejection of a multi-peaked noise spike by the sample-to-sample comparison technique and show the counts in the up/down counter and a double noise spike signal.

DETAILED DESCRIPTION OF THE INVENTION

The capability of a tool touch detector to avoid erroneous touch event detections caused by mechanically-generated noise spikes, and to do this with minimum delay in the detection of true touch events, has been shown to be important to its use for measuring parts on a machine tool during the machining operation. This is because noise spikes from such sources as machine bearings can produce false tool touch detections that correspond to false part surface location measurements. Minimization of delay time is important for two reasons. First, the advance of the tool between the instant of touch and the delayed touch detection produces an error in the indication of part surface location. Second, this delay, added to the other system delays that prevent instantaneous stopping of the tool advance, permits the tool to advance into the part, thus producing some degree of part marring. At a reasonably slow tool advance rate of one inch per minute each millisecond of delay corresponds to a 0.016 mil tool advance. Part surface location accuracy of about 0.1 mil, a reasonable goal, requires keeping the delay before touch detection below 6 milliseconds, or else, if the delay is sufficiently uniform, compensating for it in the surface location function. Part surface marring goals might be less than about 0.2 mil for finished surfaces, and considerably greater tool penetration depths may be acceptable for non-finished surface measurements. Special arrangements may be necessary to cause the tool advance to stop in less than about 50 milliseconds after the machine control receives the tool touch signal from the Machine Tool Monitor.

The principal reason for the delay between the actual first tool/workpiece surface contact and the touch detection decision is the need for collecting and analyzing a set of signal samples containing enough information to permit a reliable decision as to whether a detected signal level increase is caused by a noise spike or a true tool touch event. Since there are penalties for this delay in terms of workpiece surface location accuracy and potential part marring, it is important to minimize the delay by checking those noise spike and touch signal features which are distinguishable with the minimum number of signal samples. It has been found that the noise spike shape, after processing the sensor signal to prepare it for sampling, is essentially constant. The noise spike peak, at which the signal slope changes from positive to negative, occurs at about the same time after the start of the spike. This is used to distinguish a tool touch from noise pulses.

Figure 1:
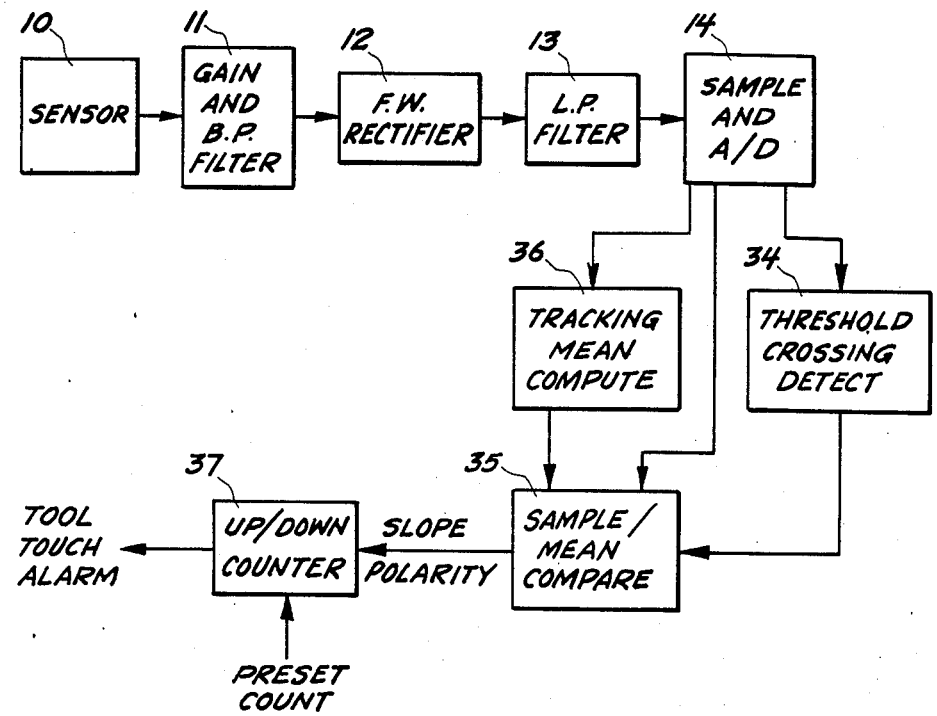
FIG. 1 is a block diagram of the improved tool touch detection system.

Turning to FIG. 1, the acoustic vibrations caused by initial contact between an advancing tool insert and a workpiece, and other machine tool noises as the tool slowly advances, are detected by an appropriate vibration sensor 10 such as an accelerometer. The sensor signal is then preprocessed in an analog signal channel whose output signal contains the tool touch event signature that is recognized by the digital signature recognition logic. The analog signal channel includes an amplifier and bandpass filter 11, and an energy detector comprised of a full wave rectifier 12 and low pass anti-aliasing filter 13. The output is a unipolar analog waveform proportional to the amplitude of vibrations in the chosen band. The tool touch detector utilizes acoustic vibrations in the 30 to 100 KHz region; it is necessary to attenuate high amplitude machinery noise which tends to be concentrated at lower frequencies, and above 100 KHz the vibrations are strongly attenuated unless the sensor is close to the tool/workpiece interface. The preprocessed vibration signal is sampled and converted to digital format by appropriate sample and analog-to-digital conversion circuitry 14.

Figure 2:
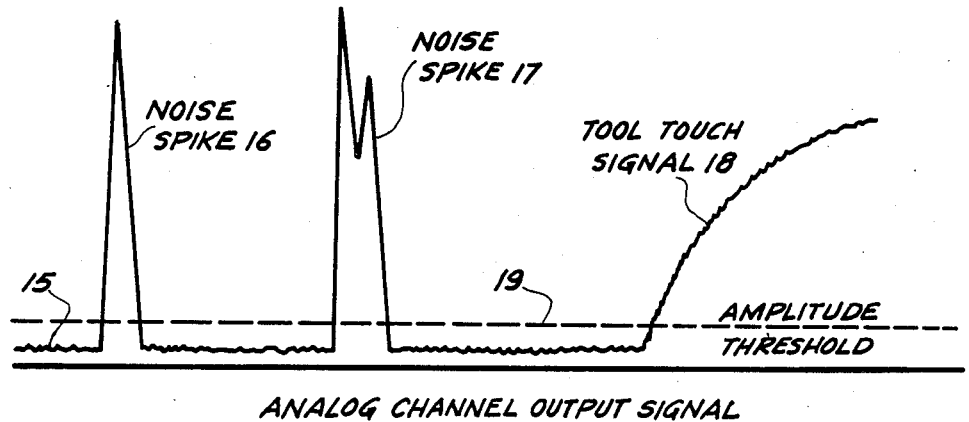
FIG. 2 shows the vibration signal at the analog channel output where spiky noise is encountered before making a valid touch to the part.

The analog channel output signal, FIG. 2, contains not only the tool touch signature, but also any noise spikes that might be generated by the machine tool mechanism. During an operation to check workpiece dimensions, the tool holder and cutting insert (see FIG. 3) are moved rapidly toward the part and then slowed down to a rate of about 1 inch per minute until contact is made. Continuous traverse noise, the background noise produced by normal operation of the machine tool with no tool/workpiece contact, is sensed. On some machine tools spiky noise of short duration but high amplitude is encountered, and others are relatively quiet and do not generate such noise pulses. There is a sudden and substantially continuous increase in vibration level when the slowly advancing tool insert first touches the workpiece. These mechanical or acoustic vibrations are sensed by an accelerometer and converted to an electrical signal. The low continuous traverse noise signal is indicated at 15, high amplitude single-peaked and multi-peaked noise spikes at 16 and 17, and the gradually rising tool touch signal at 18. The tool touch detection logic is triggered by processed vibration signals that rise above a preset amplitude threshold 19, and ignores any noise spikes that may be present. Threshold level 19 is a minimum factor above, say 2 to 3 times, the signal peaks of the continuous traverse noise; it is preset or may track variations in the machine tool operating noise level.

Before proceeding, FIG. 3 illustrates a typical Machine Tool Monitor installation on a horizontal turret lathe. The monitor is for vertical turret lathes and other types of machine tools such as milling machines, machining centers, and drills. The illustrated lathe components are the machine frame 20, Z slide 21, headstock 22, chuck 23, workpiece 24, and X cross slide 25. A rotatable tool turret 26 has several tool blocks 27 (only one is shown) each supporting a tool holder 28 and cutting insert 29. The machine tool control 30 is, for instance, General Electric's MC2000; these are also known as a numerical control or computerized numerical control. The accelerometer 31 or other vibration sensor is mounted on the lathe turret or turret base in a location with good coupling to vibrations generated at the tool/workpiece interface. The second and third major components of the Machine Tool Monitor are an analog preprocessor 32 preferably located on the lathe near the turret to minimize electronic noise pickup, and a remotely located digital processor 33.

One suitable sensor is the Vibrametric VM1000 accelerometer (Vibra-Metrics, Inc., Hamden, CT), used in a region of relatively flat response below its resonant frequency. It is usually located on the rotatable turret and a miniature slip ring and coaxial wire connect it to the analog preprocessor 32. An alternative location, which depends upon the lathe design, is off the turret where no rotating coupler is required. When this accelerometer is the sensor, the analog signal processing channel includes a bandpass filter to restrict the signal to a 35 KHz to 60 KHz region, and the energy detector is comprised of a full wave rectifier and a 500 Hz low pass anti-aliasing filter to produce the signal energy versus time analog waveform. Other accelerometers and analog signal processing arrangements are described in the cross-referenced copending applications.

The major functions of the improved tool touch detection system in the digital processor microcomputer are illustrated in FIG. 1. A tool touch alarm is generated with minimized detection delay while dismissing single-peaked and multi-peaked noise pulses as false alarms. The first task of the tool touch detection logic, performed by threshold crossing detect circuitry 34, is to detect any digital signal sample above the preset low threshold level 19. If the signal sample is above this threshold level, the logic then determines the polarity of the signal amplitude slope. Above-threshold samples are routed to sample/mean compare circuitry 35, where slope polarity is determined by comparing the amplitude of the current sample with that of the current value of the tracking mean, computed as the average value of the amplitudes of the current sample and the N preceding samples, where N is a small number less than about 10. The tracking mean is computed by circuitry 36. The system also utilizes a preset up/down counter 37 preset to a number of counts slightly greater than the maximum number that can occur from the start of a single-peaked noise spike until its peak amplitude is passed. The counter counts down each time the signal amplitude indicates a positive slope and counts up each time a negative slope is indicated. When the counter counts down to zero, a tool touch alarm is generated. Single-peak and multi-peak noise spikes do not cause the counter 37 to count down to zero, and no alarm is generated. Alternatively, a counter which starts at zero and counts up to the preset number may be used.

It is important to minimize the delay to an alarm by checking those noise spike and touch signal features which are distinguishable with the minimum number of signal samples. A key feature of the MTM tool touch detection system is that the analog signal channel, in preprocessing the accelerometer signals before they are sampled by the digital processor or subsystem (see FIG. 2), outputs an almost invariant pulse shape when the accelerometer signal is generated in response to a metal-to-metal impact. This is because such an impact signal is of such short duration (or, equivalently, of such broad frequency content) that it constitutes almost an impulse excitation of the MTM analog channel filters, and especially of the 500Hz low pass filter 13. The impulse response of a linear system is constant.

Since the relation between the characteristics of the MTM analog channel filters and those of metal-on-metal impact accelerometer output signals results in an essentially constant spike noise shape, it is possible to identify a noise spike and distinguish it from a tool touch signal before the end of the noise spike. The technique that is used in the MTM equipment depends upon the fact that the noise spike peak, at which the signal slope changes from positive to negative, almost always occurs about 1.5 milliseconds after the start of the spike. The total spike duration, on the other hand, is on the order of 10 milliseconds because the decay from the peak is slower than the rise to the peak.

The tool touch detection logic does not, however, classify as a tool touch signal every signal whose positive slope continues beyond 1.5 milliseconds. This is because of the rather sparse sampling of the spike signal and the possibility, in a dense spike environment, of two or more noise spikes overlapping to produce a composite noise pulse with multiple peaks, and therefore multiple positive slope regions. The directional counter 37 is preset to a selectable number and decremented on each signal sample where a positive slope is detected and a positive slope indication or signal is sent to the counter. The preset number according to the preferred embodiment is equivalent to about 3 milliseconds of signal samples, so on a true touch signal, with monotonically increasing signal amplitude, the touch detection is delayed only 3 milliseconds after the signal first rises above the detection threshold 19.

FIGS. 4a and 4b illustrate how counter 37 counts down to zero in minimum time when a tool touch acoustic signature is encountered. Touch signal 18' is shown as increasing linearly, and at each sample time an above-threshold sample is detected, comparison of the new sample with the tracking mean indicates a positive slope, and a positive slope count or indication is presented to the counter. An alarm is generated on the twelfth successive down count. The tracking mean reference shown in dashed lines uses only two samples for the mean computation in order to closely track the processed vibration signal. The preset number to alarm shown in the figures are for illustration only; numbers from 6 to 20 may be used. Smaller numbers minimize delay and larger ones increase noise spike immunity safety factor. The number currently used is 6 counts or 6 samples to alarm, corresponding to 3 milliseconds with a $\frac{1}{2}$ millisecond sample period.

FIGS. 5a and 5b illustrate rejection of a single-peaked noise spike by the mean reference technique. This tracking mean reference needs to track the signal level closely if the signal peak is to be detected quickly, since otherwise signal samples taken beyond the peak may still have levels above that of the lagging mean, and will therefore be mistakenly attributed to a continuation of the initial positive signal slope. This close tracking is achieved by averaging only a small number of signal samples to compute the tracking mean (and by not clipping the most recent sample in the mean computation window, as may be done in the tool break detection algorithm). The tool touch detection system currently uses only two samples for this mean computation function. On a single noise spike, it is seen in FIG. 5a, the bidirectional counter counts back up toward the preset value shortly after the negative slope of the spike begins, so there is no detection. If each above-threshold sample is compared only to the preceding above-threshold sample, or with a two sample mean, the counter reversal occurs even more quickly.

FIGS. 6a and 6b show rejection of a multi-peaked noise spike by the sample-to-sample comparison technique. The counter, originally set at 12, counts down so long as a positive slope is detected, counts up as soon as the first peak is passed and the slope changes to negative, counts down when the positive slope of the second peak is detected, and again counts up after this second peak is passed and the slope is negative. Thus there is no tool touch detection. A modification is that the count up rate can be set to be greater than the count down rate. On the multi-peak noise pulse, the counter never succeeds in counting down to zero because the counter counts up, when the signal slope is not positive, at a higher rate than the count down rate when the signal slope is positive.

Summarizing, the method of detecting with minimized delay the initial touch of a cutting tool to a workpiece comprises detecting any signal sample above a low amplitude threshold which exceeds the continuous traverse noise level of the machine tool with no tool/workpiece contact, comparing every current above-threshold sample with the previous above-threshold sample, or with the mean of the current and N previous samples, generating a positive or negative signal slope count, and generating a tool touch alarm signal when the positive slope counts exceed the negative slope counts by a preset number high enough to reject single-peaked and multi-peaked noise spikes as false alarms. This preset number is slightly greater than the maximum number of counts in a time period from crossing the amplitude threshold to the peak of a high amplitude noise spike.

Two other techniques of noise spike rejection based upon similar principles can be identified, but are not used in the current tool touch detector implementation. One approach would be to reject the signal as a noise spike as soon as any negative slope sample is detected. This approach is not used because it has been observed in experimental data that a true touch signal may have a momentary negative slope region due to an uneven part surface. Another possibility is to quantitatively measure the initial positive signal slope, rejecting slopes too great to be associated with tool touch signals. This might give good results and even shorter detection delays are possible. However, the quantitative slope value, unlike the slope polarity change timing, is not invariant from spike to spike, but is very sensitive to spike peak amplitude which, in turn, varies widely.

The current approach to minimize delay tool touch detection is compatible with the Machine Tool Monitor tool break detection system. The following commonly assigned copending applications on tool break detection, all C. E. Thomas et al, are cross-referenced: Ser. Nos. 664,188 filed October 24, 1984; 664,189 filed Oct. 24 1984; 685,005 filed Dec. 21, 1984; now U.S. Pat. Nos. 4,636,780; 4,636,779; and 4,642,617. Ser. No. 744,083, filed June 12, 1985, covers a tool break and touch detector optimized for the machining conditions using part program information. The present tool touch detection scheme is implemented by a subset of the tool break detection software selected and optimized by user-selectable input parameters.

While the invention has been particularly shown and described with reference to preferred embodiments thereof, it will be understood by those skilled in the art that the foregoing and other changes in form and details may be made without departing from the spirit and scope of the invention.

What is claimed is:

1. An improved system to detect the initial touch of a cutting tool and workpiece on a machine tool comprising:
   a vibration sensor to generate a signal corresponding to vibrations at the tool/workpiece interface and other machine tool noises;
   means to amplify said signal and attenuate lo,er frequency machinery noise, and means to detect the energy in an acoustic frequency band below 100 KHz and produce an analog channel output waveform;
   means for sampling the latter and converting analog signal samples to digital format; and
   tool touch detection logic comprising means to detect any signal sample above a low threshold level which exceeds the continuous noise level resulting from operation of said machine tool with no tool/workpiece contact, means for thereafter comparing every current above-threshold sample with at least one previous sample to indicate signal slope polarity, and means to generate a tool touch alarm when positive slope indications exceed negative slope indications by a given number selected to reject single-peaked and multi-peaked noise pulses as false alarms.

2. The system of claim 1 wherein said last-mentioned means is comprised of an up/down counter.

3. An improved system to detect the initial touch of a cutting tool and workpiece on a machine tool comprising:
   a vibration sensor to generate a signal corresponding to vibrations at the tool/workpiece interface and other machine tool noises;
   means to amplify said signal and attenuate lower frequency machinery noise, and means to detect the energy in an acoustic frequency band below 100 KHz and produce a processed analog channel output waveform;
   means for sampling the latter and converting analog signal samples to digital format; and
   tool touch detection logic comprising means to detect any signal sample above a low threshold level which exceeds the continuous noise level resulting from operation of said machine tool with no tool/workpiece contact, means for computing a tracking mean which is the average of a current sample and N preceding samples, means for comparing every current above-threshold sample with said tracking mean to determine signal slope polarity, and means to generate a tool touch alarm when positive slope indications exceed negative slope indications by a given number selected to reject single-peaked and multi-peaked noise spikes as false alarms.

4. The system of claim 3 wherein said tool touch alarm is communicated to a machine tool control which controls said machine tool.

5. An improved machine tool monitor to detect light rubbing contact of a cutting tool and workpiece comprising:
   an accelerometer to generate a signal corresponding to vibrations at the tool/workpiece interface and other machine tool noises;
   an analog preprocessor comprising means to amplify and bandpass filter said signal to attenuate lower frequency machinery noise, and energy detector means comprised of a rectifier and anti-aliasing low pass filter, said preprocessor outputting a unipolar analog waveform containing a tool touch event signature, noise spikes, and a continuous traverse noise signal;
   a digital processor to generate a tool touch alarm with minimized detection delay while dismissing single-peaked and multi-peaked noise spikes;
   said digital processor comprising means for sampling said analog waveform and converting signal samples to digital format, means to detect any signal sample above a low preset threshold level which exceeds said continuous traverse noise signal by a minimum factor, means for computing a tracking mean which is the average of a current sample and N preceding samples, means for comparing every above-threshold sample with said tracking mean to generate a positive or negative slope count, and means to generate a tool touch alarm when positive slope counts exceed negative slope counts by a preset number.

6. The monitor of claim 5 wherein said last-mentioned means is an up/down counter.

7. The monitor of claim 6 wherein said preset number of excess positive slope counts to trigger said alarm is slightly greater than the maximum number of counts in a time period from crossing said threshold to the peak of a high amplitude single-peaked noise spike.

8. The method of detecting with minimized delay the initial touch of a cutting tool to a workpiece comprising:

sensing the vibrations of a machine tool as said cutting tool slowly advances toward said workpiece and makes light rubbing contact, and converting these vibrations to an electrical signal;

preprocessing said signal in an analog channel by amplifying and filtering said signal to attenuate lower frequency machining noise, and generating a unipolar analog waveform representative of the amplitude of vibrations in a chosen band below 100 KHz;

sampling said analog waveform and converting signal samples to digital format;

detecting any signal sample above a low amplitude threshold which exceeds the continuous traverse noise level of said machine tool with no tool/workpiece contact, comparing every current above-threshold sample with at least one previous above-threshold sample and generating a positive or negative signal slope count, and generating a tool touch alarm signal when the positive slope counts exceed the negative slope counts by a preset number which rejects single-peaked and multi-peaked machine tool noise spikes as false alarms.

9. The method of claim 8 wherein said preset number to trigger an alarm is slightly greater than the maximum number of counts in a time period from crossing said threshold to the peak of a high amplitude single-peaked noise spike.

10. The method of claim 9 and the step of communicating said tool touch alarm signal to a machine tool control to stop the advance of said cutting tool.

* * * * *